(12) United States Patent
Huang et al.

(10) Patent No.: US 7,483,047 B2
(45) Date of Patent: Jan. 27, 2009

(54) CONTROL METHOD FOR MARKING LABEL SIDE OF OPTICAL DISC

(75) Inventors: Chih Wei Huang, Hsinchu (TW); Tao-Yen Wei, Hsinchu (TW); Yi-Shih Wang, Hsinchu (TW)

(73) Assignee: Lite-On It Corp., Taipei (TW)

( * ) Notice: Subject to any disclaimer, the term of this patent is extended or adjusted under 35 U.S.C. 154(b) by 106 days.

(21) Appl. No.: 11/616,391

(22) Filed: Dec. 27, 2006

(65) Prior Publication Data
US 2007/0165102 A1 Jul. 19, 2007

(30) Foreign Application Priority Data
Jan. 13, 2006 (TW) ............................... 95101501 A

(51) Int. Cl.
*B41J 2/47* (2006.01)
*B41J 2/435* (2006.01)
*G11B 5/09* (2006.01)
*G11B 7/24* (2006.01)

(52) U.S. Cl. ........................ 347/224; 347/225; 347/253; 347/262; 369/275.1; 369/275.3; 369/47.1

(58) Field of Classification Search ....................... None
See application file for complete search history.

(56) References Cited

U.S. PATENT DOCUMENTS
2006/0126474 A1 * 6/2006 Hanks ........................ 369/59.1

* cited by examiner

*Primary Examiner*—Matthew Luu
*Assistant Examiner*—Kendrick X Liu
(74) *Attorney, Agent, or Firm*—Kirton & McConkie; Evan R. Witt

(57) ABSTRACT

An inner ring signal and an outer ring signal according to specific patterns formed on the label side of the optical disc are generated. Timing starts when the outer ring signal reveals the end of a positioning pattern and stops to obtain a timing value when the inner ring signal reveals the start of a square wave defining a specified spoke. A starting spoke is defined according to the inner ring signal and the specified spoke. A deviation bit value is calculated according to the timing value and a bit number of a data to be marked on a certain track of the optical disc. The data is rotated according to the deviation bit value, and then marked on the certain track, starting with the starting spoke.

8 Claims, 7 Drawing Sheets

CONTROL METHOD FOR MARKING LABEL SIDE OF OPTICAL DISC

FIELD OF THE INVENTION

The present invention relates to a control method for use in an optical disc recording apparatus, and more particularly, to a control method for marking the label side of an optical disc by the optical disc recording apparatus.

BACKGROUND OF THE INVENTION

In the age of multimedia, high volume high quality video and audio data and even high quality game software have occupied a great part of the market. These data need to be stored in a fast-accessing, low cost and high capacity storage medium, and is preferably able to efficiently make spare copies. Various recordable/rewritable optical discs and corresponding recording apparatus having the feature of making a spare copy of large amount of data in an inexpensive way are thus developed. An optical disc is commonly used for storing large amount of video and audio data, software, or material and configuration data in professional applications. Therefore, not only has the optical disc recording apparatus become indispensable peripheral equipment for both personal computers and laptops in today's computer industry, in the mainstream digital consumer market, optical disc recording apparatus have begun playing an important role. Users who frequently use the optical disc recording apparatus to create a spare copy of data into a commercial recordable/rewritable optical disc that is pre-designed with monotonous and common label side might suffer from distinguishing these recorded discs.

Conventionally, permanent markers or special pens are used to mark the recorded disc, but human's handwritings are subject to inconvenience or misunderstanding. Printed labels stuck on the non-data face of the recorded disc are another option to specify the information of the disc. The requirements on weight distribution and adhesion of the labels are critical because the uneven weight distribution would adversely affect the rotation of the disc and the fallen-off label could jam the machine.

In light of these issues, a special dye layer that can be burned to form a desired configuration is provided on the label layer of the optical disc. In this way, the label side can be provided with desired marks such as patterns or letters. Marking the label side of an optical disc is generally performed after data is written into the data side of the optical disc. The disc is taken out of the optical disc recorder, flipped to the other side and placed back into the optical disc recorder, and the optical head of the optical disc recorder then projects laser light onto the label side of the optical disc where the special dye is applied to induce a chemical reaction, thereby changing the color of the dye layer and forming a desired pattern on the label side.

Please refer to FIG. 1(a) which schematically shows the label side of a recordable/rewritable optical disc. The optical disc 10 has radius of 60 mm, and includes a plurality of regions, e.g. a concentric center hole 12 having radius of 7.5 mm and an annular information area 11 lying between radii 22.35 mm and 59 mm. In addition, there is an annular reference region 13 disposed between the center hole 12 and the data area 11 and adjacent to information area 11, as shown in FIG. 1(b). The annular reference region 13 is previously provided with a certain pattern and includes an outer ring 14 and an inner ring 16. The outer ring 14 that is not uniformly patterned is recorded with a media ID, a saw tooth and an index mark. The inner ring 16, on the other hand, is provided with a uniform pattern, i.e. alternate "dark" and "bright" spokes, for rotation control while marking the label side. Meanwhile, the saw tooth on the outer ring 14 is used for shift calibration of the optical head, and the media ID and index mark provide other information relating to the optical disc 10. In general, the information of the outer ring 14 is accessed by the optical head, while the information of the inner ring 16 is realized by a spoke detector.

FIG. 2(a) is a diagram schematically illustrating a part of an optical disc recording apparatus, wherein a turn table 50, a spindle motor 60, a spoke detector 70 and an optical pickup head 80 are shown. When the specific optical disc 10 is placed on the turn table 50 that is rotated by the spindle motor 60, the information recorded in the outer ring 14 and the inner ring 16 of the reference region 13 can be realized by the optical head 80 and the spoke detector 70, respectively. The spoke detector 70 is mounted in the optical disc recording apparatus, and comprises a light source and a light receiver. The light source emits a light beam onto the inner ring 16 and the reflected light beam is received by the light receiver, thereby generating an inner ring signal or spoke signal. The optical head 80 is controlled by a stepping motor to move along the radial direction for reading the Media ID, Saw Tooth and Index Mark recorded in the outer ring 14, thereby generating an outer ring signal. Since these 400 spokes are equally spaced in the inner ring 16, the spoke signal generated by the light receiver is a square wave signal with substantially 50% duty cycle. When the light receiver generates one cycle of square wave, it is indicated that the optical disc has rotated 1/400 cycle, and the generation of 400 square waves represent one cycle of rotation of the optical disc.

The starting spoke for marking the optical disc 10 is located according to both the patterns in the outer ring 14 and the inner ring 16. The starting spoke can be any of the 400 spokes (Spoke No. 0~399), and usually the optical disc recording apparatus defines Spoke No. 0 as the starting spoke. After the starting spoke is defined, all circumferential positions on the optical disc 10 can be defined by counting the number of the square waves generated by the spoke detector 70.

In general, the unit for defining the length of each black or white block in the outer ring 14 is ¼ spoke, and the Index Mark of the outer ring 14 includes a positioning pattern consisting of four alternate white and black blocks having length of 10 units, 5 units, 5 units and 5 units, respectively, as indicated by the numeral reference 18 in FIG. 1(b). Spoke No. 395 starts from the rear edge of the positioning pattern 18. In other words, as soon as the optical head 80 having detected the positioning pattern and generates an outer signal including square waves corresponding to the lengths of 10 units, 5 units, 5 units and 5 units, the square wave corresponding to Spoke No. 395 starts, as illustrated in FIG. 1(c). FIG. 1(c) is a diagram illustrating patterns of the outer ring and inter ring and an ideal outer ring signal and inner ring signal resulting from the detection of the patterns of the outer ring and inter ring around the positioning pattern 18. The output of the outer ring signal and inner ring signal continues with the rotation of the optical disc 10.

For marking the label side of the optical disc, the annular information area 11 is defined with a plurality of concentric tracks, and one track is marked at one time, starting with the inner track radially and the previously defined starting spoke circumferentially or angularly. By way of the coarse drive of the stepping motor, the fine tune of the optical head and the rotation of the optical disc, information can be recorded into designated positions in designated tracks.

The patterns or letters to be marked on the label side of the optical disc are provided by the host of the optical disc recording apparatus. Giving a marking operation to be performed on a track with radius r1 inches under the resolution of 600 dpi (Dot Per Inch) as an example, the host of the optical disc recording apparatus needs to send data of 600*(2π r1) bits to accomplish the marking, and every single bit represents a dot. Accordingly, the bit counts of data outputted by the host vary with the tracks that are different in radius, but the overall resolution is still 600 dpi.

According to the above-described prior art, the outer ring is detected and the outer ring signal is generated by an optical head while the inner ring is detected and the inner ring signal is generated by a spoke detector. As the optical head and the spoke detector are independent devices, the synchronization between the two devices is difficult. For example, the rear edge of the positioning pattern usually does not synchronize with the starting edge of Spoke No. 395. Under this circumference, there will be a time difference (Δt) existing between the outer and inner ring signals, as depicted in FIG. 2(b).

The time difference (Δt) will result in an angle difference θ1 between the same spokes 101 and 100 determined by the optical disc recording apparatus and defined on the optical disc, respectively, as depicted in FIG. 3(a). Since the marking operation in response to the data generated by the host starts with the spoke determined by the optical disc recording apparatus rather than that defined on the optical disc, the real starting spokes of the optical disc may vary with different optical disc recording apparatus. In a case that the optical disc is performed with marking operations twice by different optical recording apparatus, the resulting patterns or letters would be destroyed due to the misalignment of starting spokes, as depicted in FIG. 3(b), where r1 and r2 are two tracks processed by a first optical disc recording apparatus and a second optical disc recording apparatus, respectively, the spokes 100, 101 and 102 are the same starting spokes defined on the optical disc, determined by the first optical disc recording apparatus and determined by the second optical disc recording apparatus, respectively, and θ1 and θ2 are angle difference between the spoke 100 and the spokes 101 and 102, respectively.

SUMMARY OF THE INVENTION

Therefore, the present invention provides a control method for marking a label side of an optical disc, which exhibits compensation to solve the misalignment problem. The method includes steps of: generating an inner ring signal and an outer ring signal according to specific patterns formed on the label side of the optical disc, wherein the specified patterns include a positioning pattern in an outer ring and a plurality of spokes in an inner ring; starting timing when the outer ring signal reveals the end of the positioning pattern; stopping timing and obtaining a timing value when the inner ring signal reveals the start of a square wave defining a specified spoke; defining a starting spoke according to the inner ring signal and the specified spoke; calculating a deviation bit value according to the timing value and a bit number of a data to be marked on a certain track of the optical disc; and rotating the data according to the deviation bit value, and marking the rotated data on the certain track, starting with the starting spoke.

In an embodiment, the square wave defining a specified spoke is the first square wave detected after the timing starts, and the specified spoke is Spoke No. 395.

In an embodiment, the outer ring signal and the inner ring signal are generated by an optical head and a spoke detector of the optical disc recording apparatus, respectively.

In an embodiment, the specific pattern includes a media ID, a saw tooth and an index mark including the positioning pattern.

In an embodiment, the starting spoke is defined by counting a certain number of square waves following the square wave defining a specified spoke.

In an embodiment, the calculation of the deviation bit value includes steps of: calculating a time period per cycle of rotation of the optical disc; calculating a ratio of the timing value to the time period per cycle of rotation of the optical disc; and multiplying the bit number of the data to be marked on the certain track by the ratio.

In an embodiment, the time period per cycle of rotation of the optical disc is equal to the overall time of the occurrence of 400 square waves of the inner ring signal.

In an embodiment, the data is leftward rotated by the deviation bit value.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

For eliminating the angle difference between the starting spokes determined by the optical disc recording apparatus and defined on the optical disc, compensation is made according to the present invention.

Figure 1A:
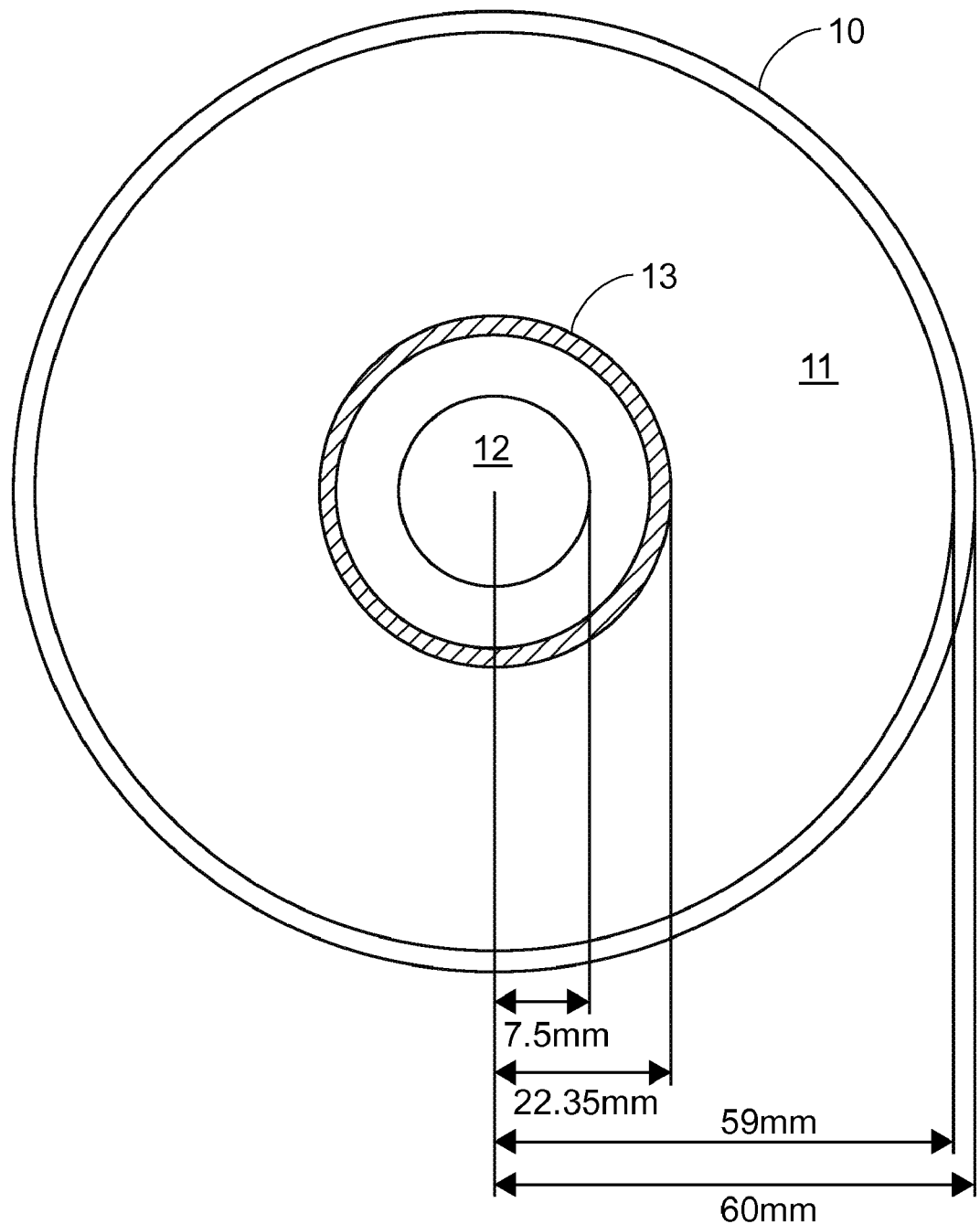
FIG. 1(a) is a diagram schematically illustrating a typical optical disc with a markable label side.
Figure 1B:
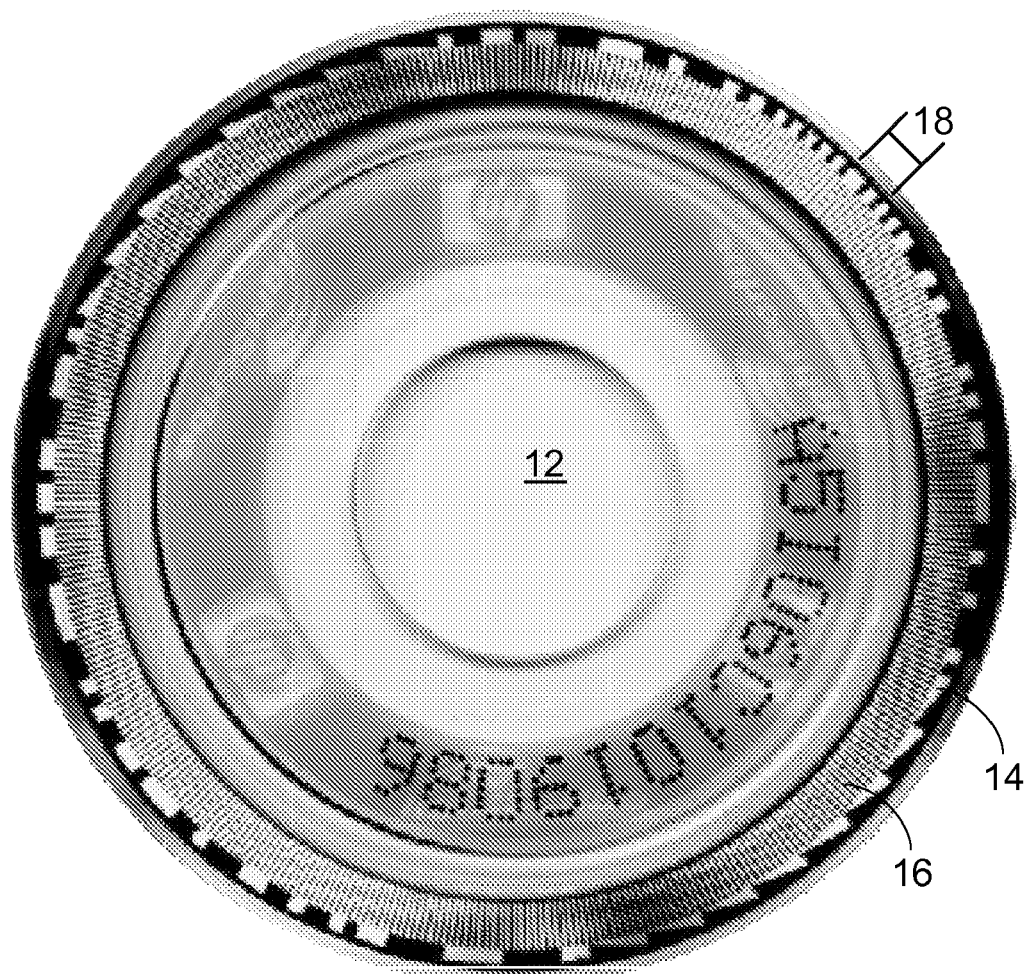
FIG. 1(b) is a diagram schematically illustrating a center portion of an optical disc with a markable label side.
Figure 1C:
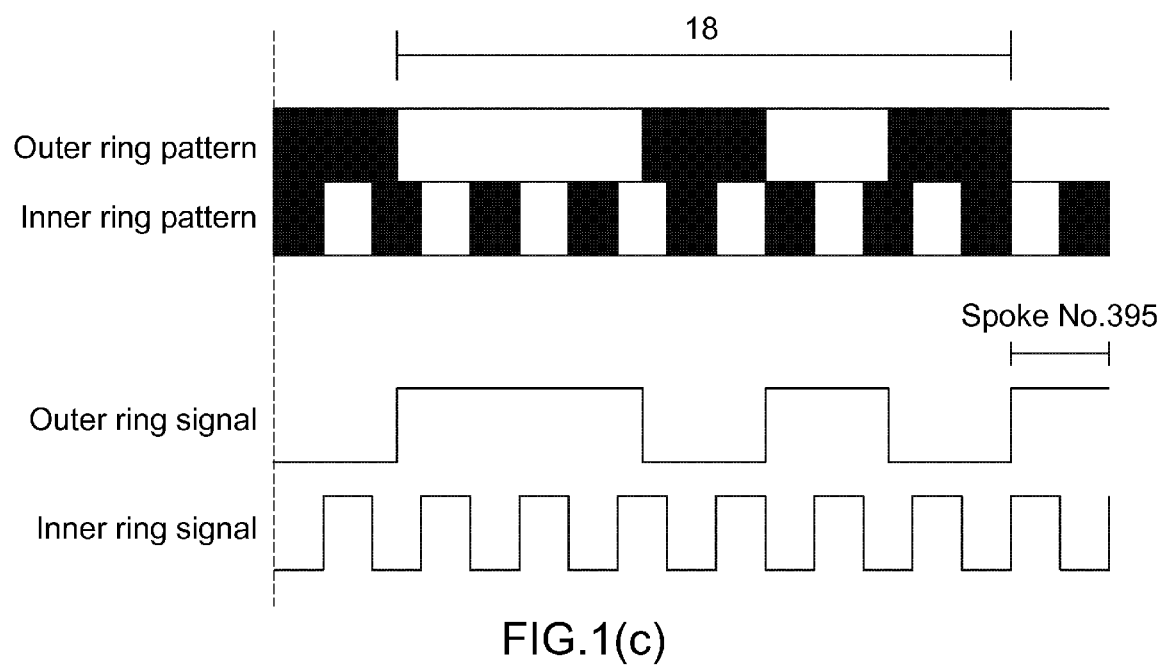
FIG. 1(c) is a diagram schematically illustrating an outer ring pattern and an inner ring pattern formed on a reference region on the label side of the optical disc and corresponding outer and inner ring signals in an ideal situation.
Figure 4:
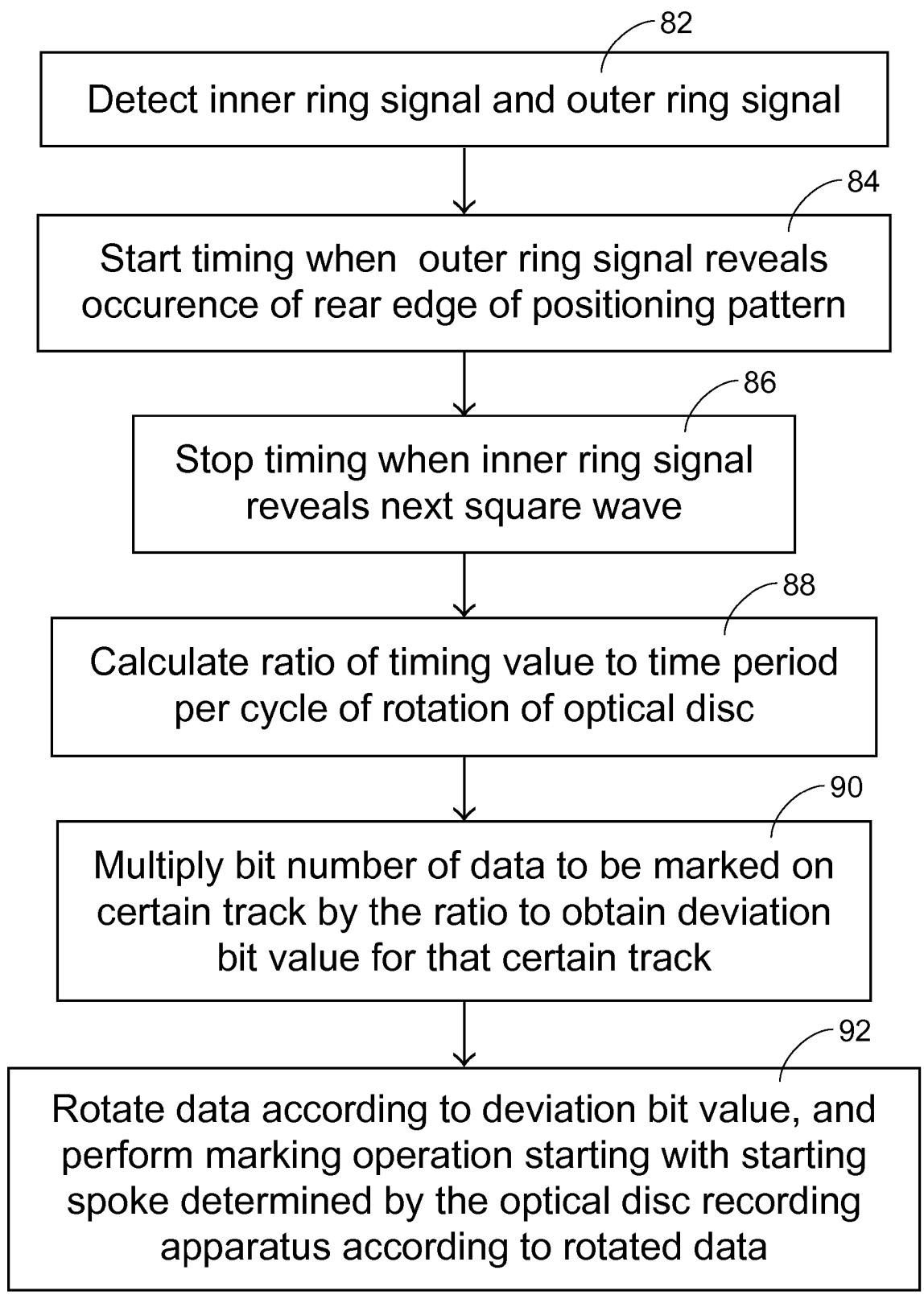
FIG. 4 is a flowchart illustrating a control method for marking the label side of an optical disc in accordance with an embodiment of the present invention.

FIG. 4 is a flowchart illustrating a control method for marking the label side of an optical disc by an optical disc recording apparatus according to an embodiment of the present invention. When an optical disc is loaded into the optical disc recording apparatus to be marked on the label side, an inner ring signal and an outer ring signal are generated by a spoke detector and an optical head, respectively, responding to the detection of patterns of the inner ring and the outer ring (step 82). When the rear edge of a positioning pattern, e.g. the pattern similar to the pattern 18 of FIG. 1(b), of the outer ring is detected, a timer of the optical disc recording apparatus starts timing (step 84). Meanwhile, square waves of the inner ring signal continue to be generated. Once the optical disc recording apparatus detects a square wave of the inner ring signal, which is generated immediately after the rear edge of the outer ring has been detected, the timer stops timing and a timing value is obtained (step 86). Meanwhile, a specified spoke is defined with the square wave stopping the timing, and the starting spoke can be located by counting the square waves following the square wave defining the specified spoke. Then, the optical disc recording apparatus calculates the ratio of the timing value to the time period per cycle of rotation of the optical disc (step 88). By multiplying the bit number of the data to be marked on a certain track by the ratio, a deviation bit value for that certain track is obtained (step 90). Accordingly, compensation can be made by rotating the data according to the deviation bit value, and the marking operation starts with the starting spoke determined by the optical disc recording apparatus according to the rotated data (step 92). For a simplified example, the data includes 10 bits "1000100101" and the deviation bit number is three. Then, the 10 bits of data becomes "0100101100" after leftward rotation. Of course, rightward rotation is also feasible for certain cases.

Figure 2A:
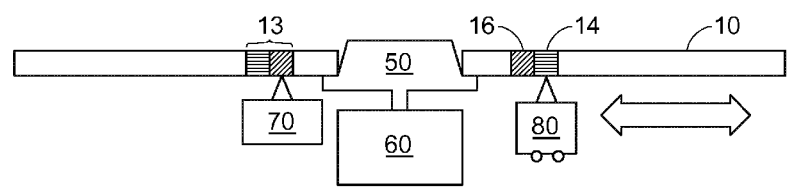
FIG. 2(a) is a diagram schematically illustrating partial devices of an optical disc recording apparatus for marking the label side of an optical disc.
Figure 2B:
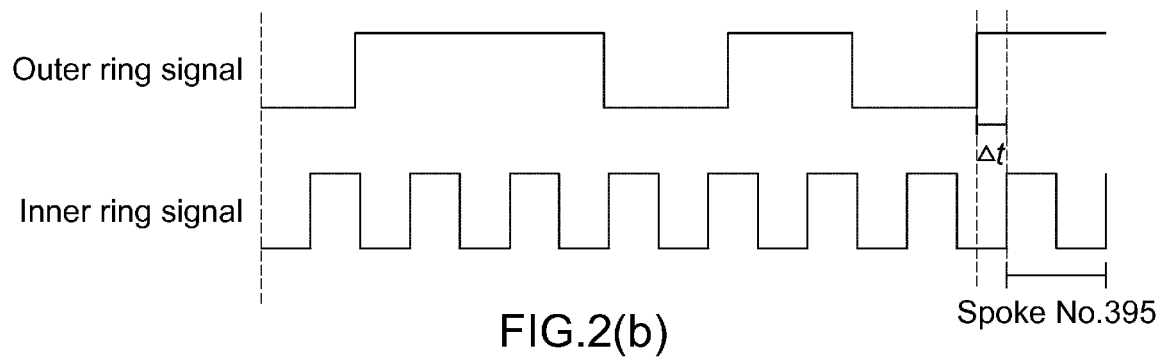
FIG. 2(b) is a diagram schematically illustrating an outer ring signal and an inner ring signal generated by the devices of FIG. 2(a) in a real situation.
Figure 3A:
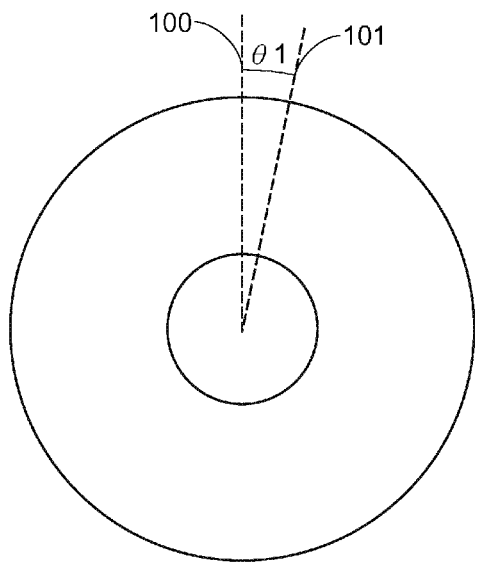
FIG. 3(a) is a diagram schematically illustrating the presence of an angle difference θ1 between the starting spoke determined by an optical disc recording apparatus and the starting spoke defined on an optical disc.
Figure 3B:
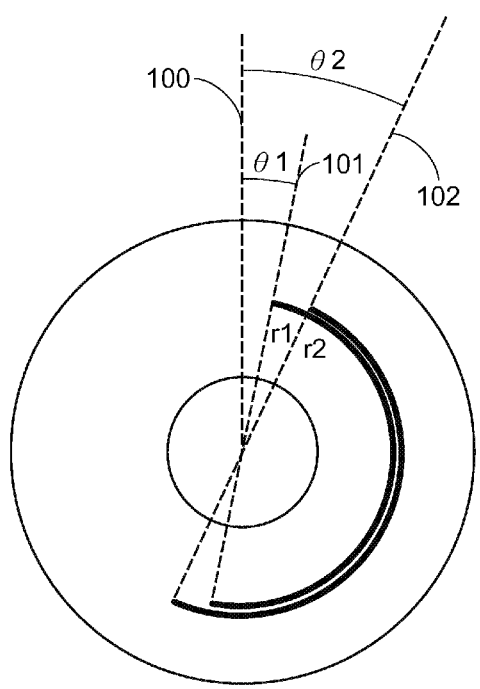
FIG. 3(b) is a diagram schematically illustrating the presence of a first angle difference θ1 between the starting spoke determined by a first optical disc recording apparatus and the starting spoke defined on an optical disc, and a second angle difference θ2 between the starting spoke determined by a second optical disc recording apparatus and the starting spoke defined on an optical disc.

As understood from the flowchart of FIG. 4 and with reference to FIG. 2(b), the time difference ($\Delta t$) between the inner ring signal and the outer ring signal can be realized by starting timing from the rear edge of the positioning pattern and stopping timing at the start of the Spoke No. 395. The ratio of the time difference to the time period per cycle of rotation of the optical disc represents the ratio of the angle difference $\theta 1$ to the entire circle of the optical disc. The time period per cycle of rotation of the optical disc in this example is equal to overall time of the occurrence of 400 square waves. Accordingly, the product of the ratio and the bit number of data for a certain track reveals the dot number on the certain track associated with the angle difference $\theta 1$, and also indicates how many bits the data should be rotated for compensation.

Figure 5A:
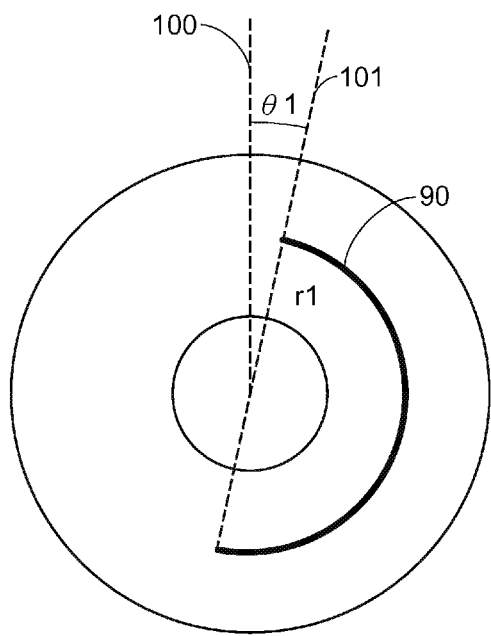
FIG. 5(a) is a diagram schematically illustrating the marking operation of a track with the presence of an angle difference θ1 between the starting spoke determined by an optical disc recording apparatus and the starting spoke defined on an optical disc.
Figure 5B:
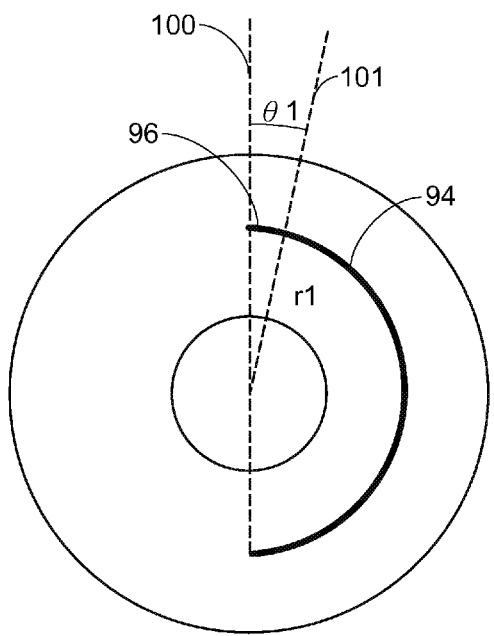
FIG. 5(b) is a diagram schematically illustrating the marking operation of a track with the elimination of an angle difference θ1 between the starting spoke determined by an optical disc recording apparatus and the starting spoke defined on an optical disc.

In order to describe the present invention in more detail, FIGS. 5(a) and 5(b) are illustrated as comparative examples. In FIG. 5(a), when a desired pattern, e.g. a curve 90, is to be marked on the track with radius r1, the marking operation starts with the spoke 101 that is considered as the starting spoke by the optical disc recording apparatus, which deviates from the starting spoke 100 defined on the optical disc by the angle difference $\theta 1$. In other words, the starting bit of the data received from the host of the optical disc recording apparatus is aligned with the spoke 101 instead of the spoke 100. With the compensation of the present invention, the marking operation still starts with the spoke 101, but it is not the stating bit of the data aligned with the spoke 101 any more. Due to the rotation of the data, the latter portion of the data is marked first so that a first curve section 94 is first form. Then a second curve section 96 is marked according to the former portion of the data, which has been rotated to the end of the data. In this way, the curve integrated with the curve sections 94 and 96 is identical to the curve 90 except that it starts with the starting spoke 100 defined on the optical disc. Since the starting spoke is always the one defined on the optical disc, it will not vary with different optical disc recording apparatus, so the misalignment problem can be solved.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A control method for marking a label side of an optical disc, comprising steps of:

generating an inner ring signal and an outer ring signal according to specific patterns formed on the label side of the optical disc, wherein the specific patterns include a positioning pattern in an outer ring and a plurality of spokes in an inner ring;

starting timing when the outer ring signal reveals the end of the positioning pattern;

stopping timing and obtaining a timing value when the inner ring signal reveals the start of a square wave defining a specified spoke;

defining a starting spoke according to the inner ring signal and the specified spoke;

calculating a deviation bit value according to the timing value and a bit number of a data to be marked on a certain track of the optical disc; and rotating the data according to the deviation bit value, and marking the rotated data on the certain track, starting with the starting spoke.

2. The method according to claim 1 wherein the square wave defining the specified spoke is the first square wave detected after the timing starts, and the specified spoke is Spoke No. 395.

3. The method according to claim 1 wherein the outer ring signal and inner ring signal are generated by an optical head and a spoke detector of an optical disc recording apparatus, respectively.

4. The method according to claim 1 wherein the specific patterns include a media ID, a saw tooth and an index mark including the positioning pattern.

5. The method according to claim 1 wherein the starting spoke is defined by counting a certain number of square waves following the square wave defining the specified spoke.

6. The method according to claim 1 wherein the calculation of the deviation bit value includes steps of:

calculating a time period per cycle of rotation of the optical disc;

calculating a ratio of the timing value to the time period per cycle of rotation of the optical disc; and multiplying the bit number of the data to be marked on the certain track by the ratio.

7. The method according to claim 6 wherein the time period per cycle of rotation of the optical disc is equal to the overall time of the occurrence of 400 square waves of the inner ring signal.

8. The method according to claim 6 wherein the data is leftward rotated by the deviation bit value.

* * * * *